United States Patent [19]

Cooper

[11] 4,369,008
[45] Jan. 18, 1983

[54] VEHICLE TRANSPORT SYSTEM

[76] Inventor: Herbert E. Cooper, 2142 N. 24th Ave., Phoenix, Ariz. 85009

[21] Appl. No.: 196,220

[22] Filed: Oct. 14, 1980

[51] Int. Cl.³ .............................................. B60P 3/008
[52] U.S. Cl. .................................. 410/29.1; 410/24.1; 410/28.1
[58] Field of Search ................................... 410/24–29, 410/13, 16, 57, 24.1, 28.1, 29.1; 105/371, 372; 206/335; 280/404, 423 R, 490 R

[56] References Cited

U.S. PATENT DOCUMENTS

| | | | |
|---|---|---|---|
| 2,004,438 | 6/1935 | Judd | 280/400 X |
| 2,096,455 | 10/1937 | Francis | 280/242 X |
| 2,146,567 | 2/1939 | Dondlinger | 410/26 |
| 2,750,225 | 6/1956 | Mettetal, Jr. | 410/28.1 |
| 3,084,970 | 4/1963 | Day | 410/29.1 |
| 3,104,127 | 9/1963 | Swartzwelder | 410/29.1 |
| 3,960,401 | 6/1976 | Harold | 410/28 |
| 4,081,196 | 5/1978 | Dandridge, Jr. | 410/28 |
| 4,106,805 | 8/1978 | Harold | 410/28 |
| 4,221,422 | 9/1980 | Harold | 410/26 |

Primary Examiner—Joseph F. Peters, Jr.
Assistant Examiner—M. J. Hill
Attorney, Agent, or Firm—Cahill, Sutton & Thomas

[57] ABSTRACT

A truck tractor and trailer rig for long distance transport of motor vehicles includes a plurality of paired tracks, each of which paired tracks supports a vehicle during transport. The paired tracks are hydraulically selectively tiltable, vertically positionable and longitudinally translatable to permit tilted overlapped storage of each of the motor vehicles which increases the number of vehicles transportable while permitting one man loading and unloading.

16 Claims, 9 Drawing Figures

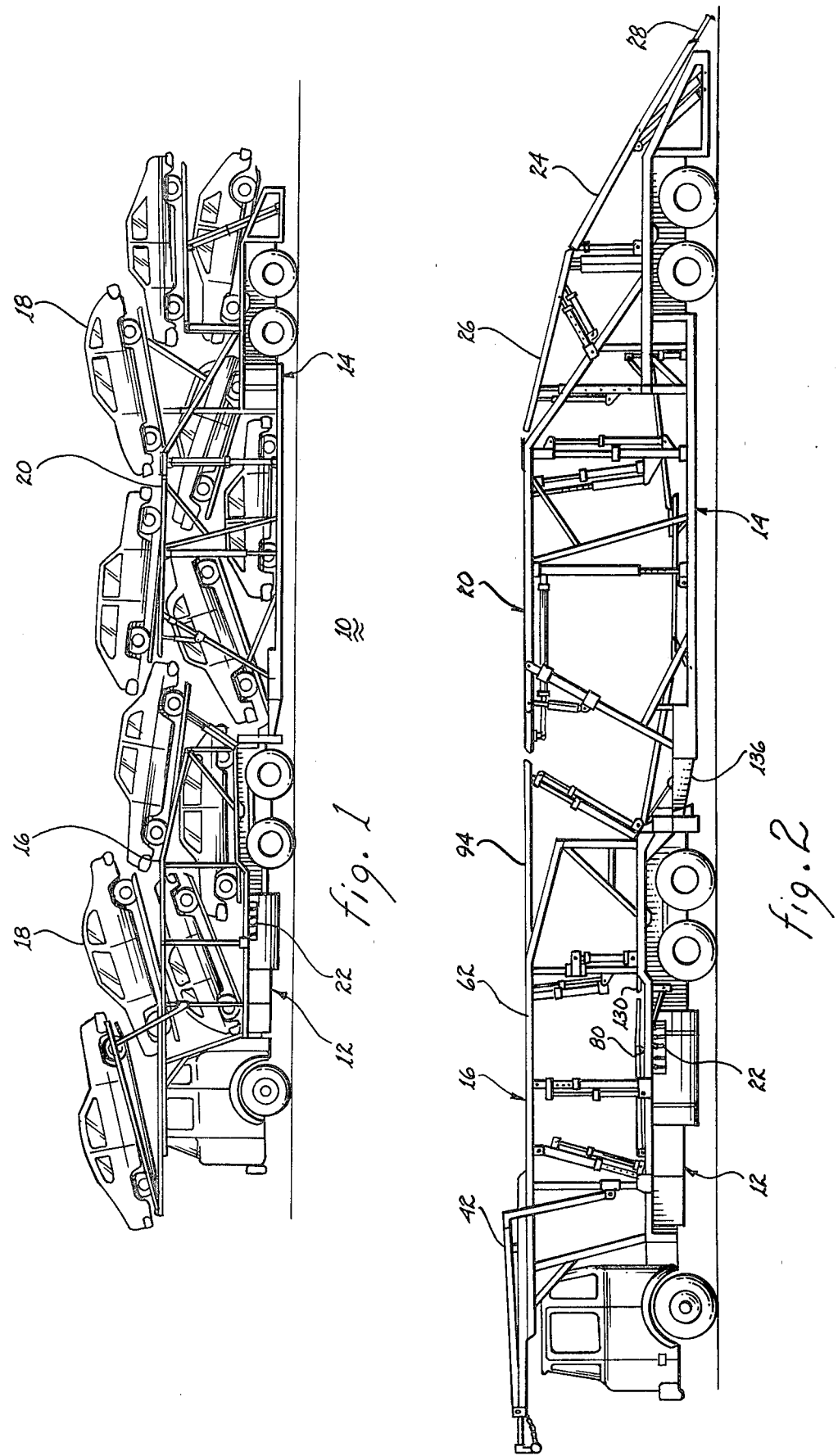

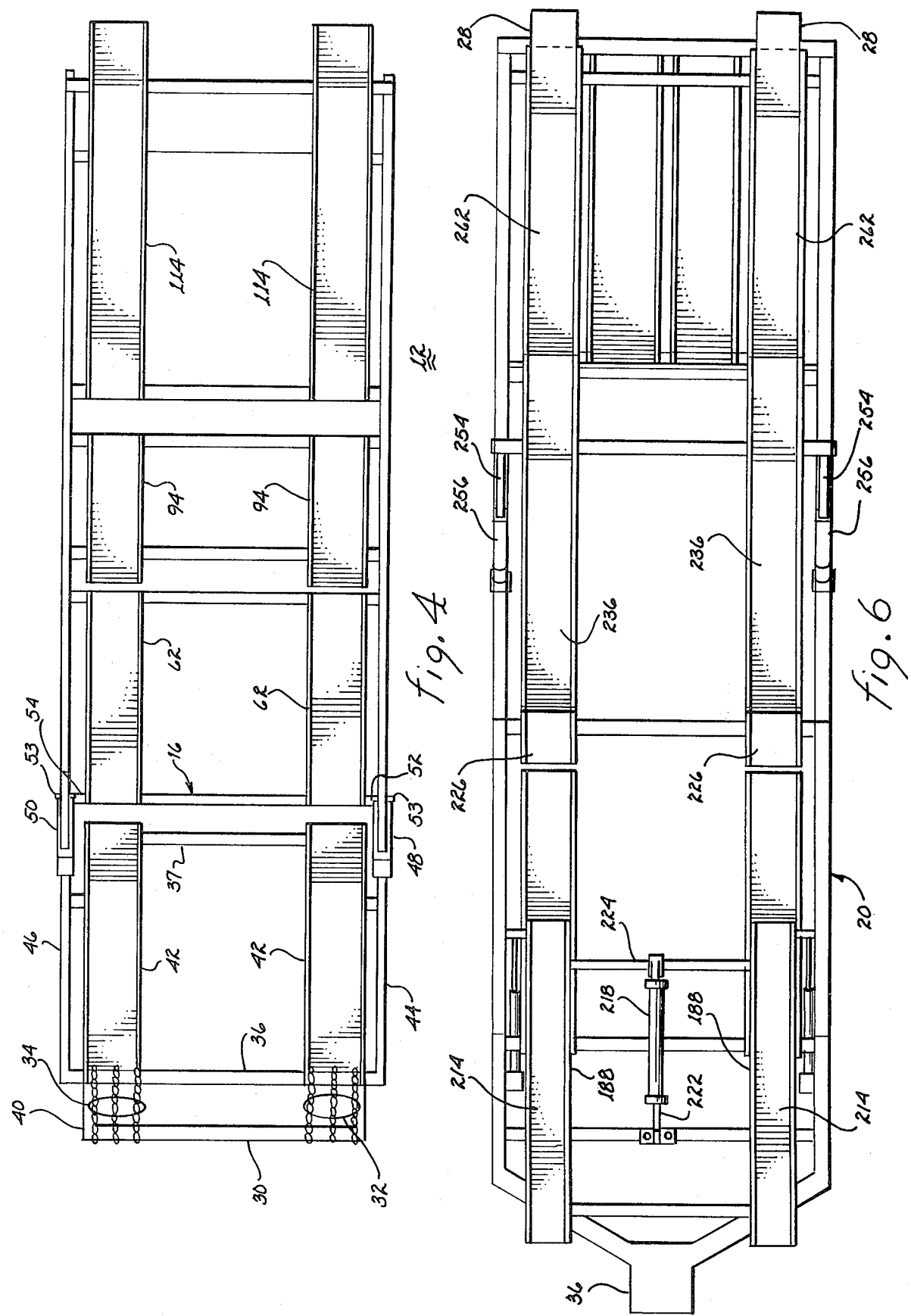

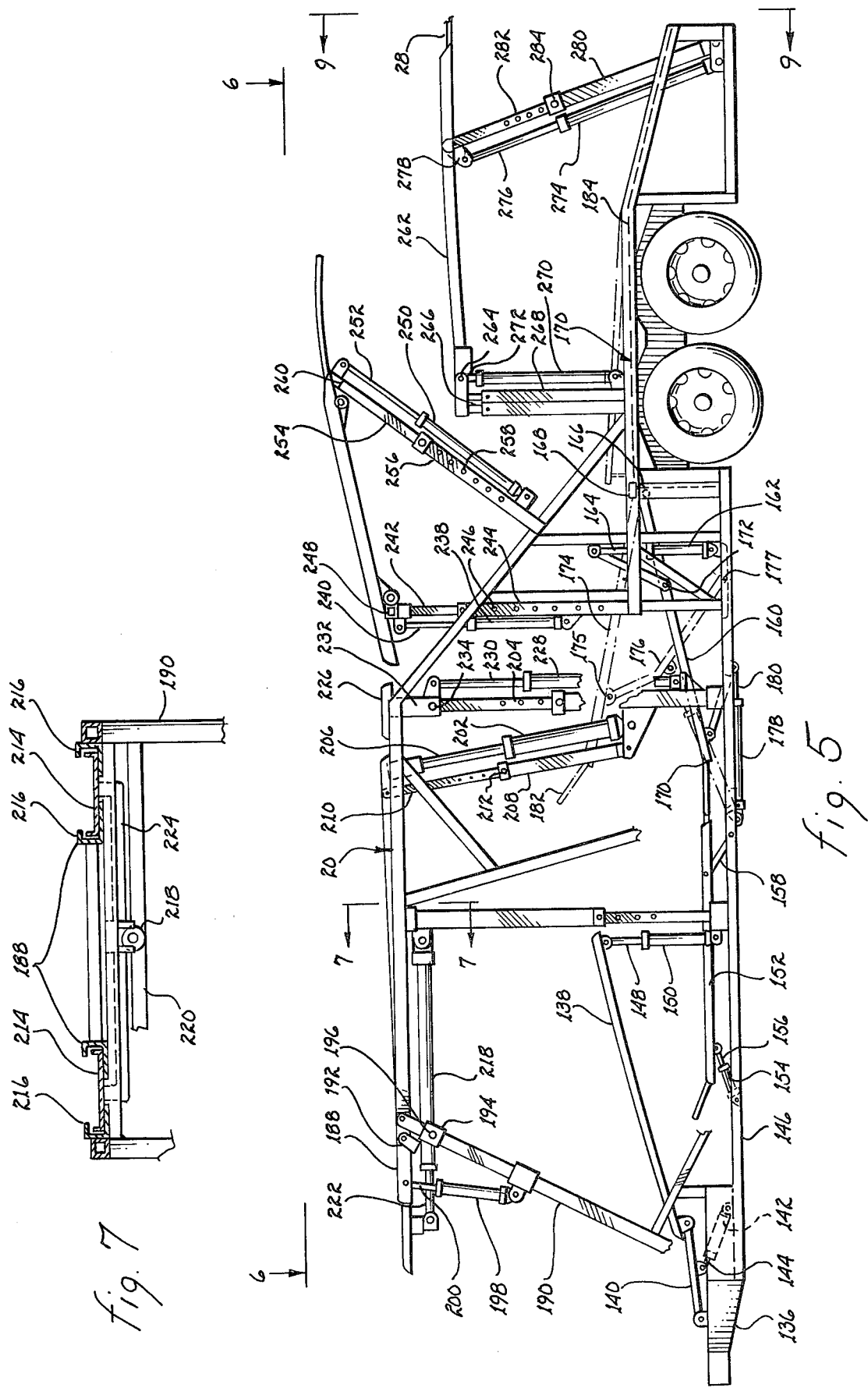

VEHICLE TRANSPORT SYSTEM

The present invention relates to on road transportation systems for motor vehicles and, more particularly, to the super structure of tractor trailer rigs for transporting motor vehicles.

Truck tractor and trailer rigs for transporting new and used motor vehicles are a common sight upon highways. They are used to transport motor vehicles from railroad depots to dealers or between dealers. Usually, payment for such transport is on a per vehicle basis for the distance traveled. It is therefore a commercial benefit to the carrier to maximize the number of vehicles transported per trip and to minimize noncompensable loading and unloading time.

Federal and state laws limit the length of truck tractor and trailer rigs to sixty-five (65) feet. This constraint limits any improvement to the number of vehicles transportable at any one time to the manner in which the vehicles are stored upon the truck tractor and trailer rig.

Most presently known and used truck tractor and trailer rigs for transporting motor vehicles have a lower and upper tier of tracks for supporting the motor vehicles. Loading and unloading is accomplished by manually positionable runners extending from the lower tier to the ground and from the upper tier to the ground. Usually, the vehicles are located bumper to bumper upon each tier, which arrangement limits the number of vehicles transportable to the total length of the tiers divided by the average length of the motor vehicles to be transported. Some improvement in density of the transported motor vehicles has been achieved by tilting a segment of two of one or both of the tiers in order to obtain some overlap of the transported motor vehicles. The increased capacity obtained thereby is usually limited to one or two additional motor vehicles.

The present invention is directed to a tractor trailer rig for transporting motor vehicles of a size equivalent to the Citation, manufactured by General Motors (presently termed an intermediate sized vehicle), by providing a plurality of tiltable vertically positionable and longitudinally translatable pairs of tracks. Each of these pairs of tracks are alignable with adjacent ones to provide a continuous path for loading and unloading the motor vehicles and, each of the pairs of tracks are repositionable after loading to reorient the supported motor vehicles in tilted overlapping relationship to adjacent loaded motor vehicles and increase the density of the motor vehicles transportable by fifty percent (50%) over that of presently known carriers.

It is therefore a primary object of the present invention to provide a high load density carrier for motor vehicles.

Another object of the present invention is to provide a motor vehicle carrier having a repositionable pair of tracks commensurate with each motor vehicle carried.

Yet another object of the present invention is to provide a motor vehicle carrier for transporting a plurality of motor vehicles in overlapped tilted relationship to one another.

Still another object of the present invention is to provide a motor vehicle carrier having a plurality of segments of paired tracks positionable with respect to one another to load, store and unload all vehicles transported.

A further object of the present invention is to provide a motor vehicle carrier capable of being loaded and unloaded by one man.

A yet further object of the present invention is to provide an over-the-cab motor vehicle carrier for tilt cab tractor trucks that permits tilting of the cab without unloading any motor vehicles.

A still further object of the present invention is to provide a motor vehicle carrier having a plurality of pairs of tracks hydraulically positionable under control of one man to perform all loading and unloading functions.

These and other objects of the present invention will become apparent to those skilled in the art as the description thereof proceeds.

The present invention may be described with greater specificity and clarity with reference to the following drawings, in which:

FIG. 1 illustrates a loaded motor vehicle carrier;

FIG. 2 illustrates an unloaded motor vehicle carrier and particularly illustrating the super structure thereof;

FIG. 4 is a top view taken along lines 4—4, as shown in FIG. 3;

FIG. 5 illustrates the super structure attendant the trailer of a motor vehicle carrier;

FIG. 6 is a top view taken along lines 6—6, as shown in FIG. 5;

FIG. 7 is a cross-sectional view taken along lines 7—7, as shown in FIG. 5;

Figure 3:
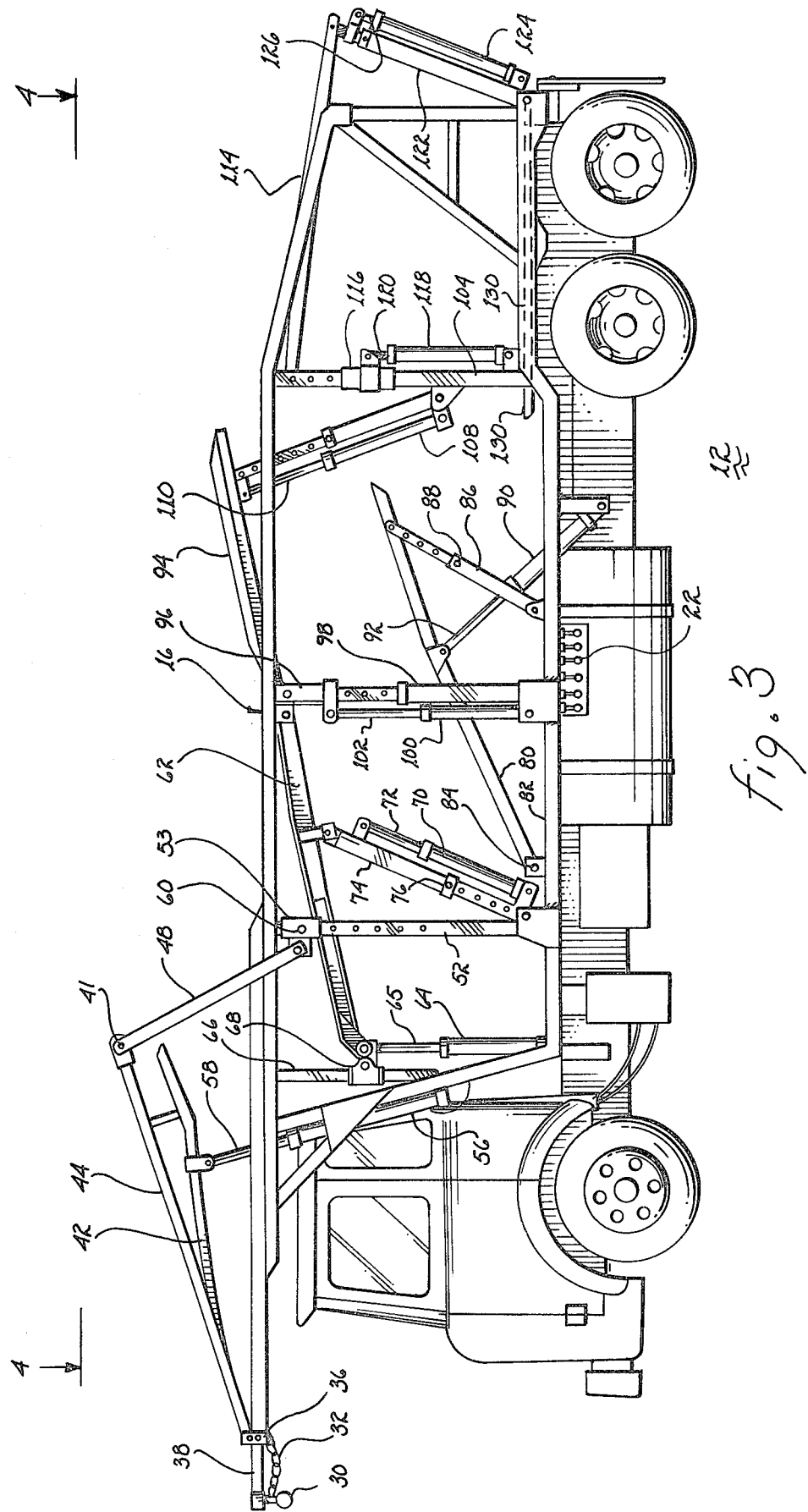
FIG. 3 illustrates the super structure attendant the truck tractor of a motor vehicle carrier.
Figure 9:
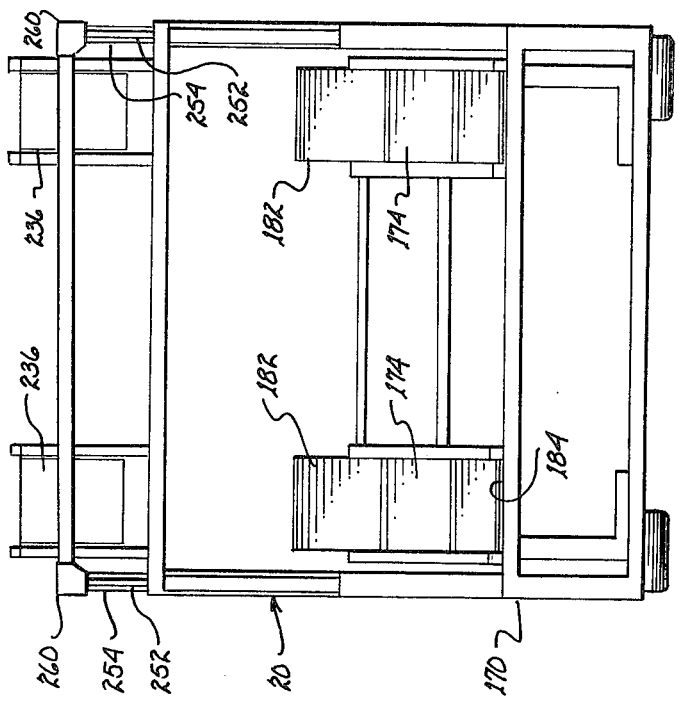
FIG. 9 is an end view taken along lines 8—8, as shown in FIG. 5.

Highway transport carriers for motor vehicles are limited in length to sixty-five (65) feet by federal and state laws. Therefore, the number of motor vehicles which can be transported upon a single carrier is a function of the size of the motor vehicles and the density with which they are loaded upon the carrier. All known presently existing carriers can carry between six to nine motor vehicles, depending upon whether the motor vehicles are of the luxury size vehicles or compact size vehicles. Since payment received for transporting motor vehicles is essentially an a per vehicle basis for the distance transported, a strong incentive exists to load a carrier with as many motor vehicles as possible to maximize the profit per trip. Despite the great financial incentive, the prior art carriers are generally limited to arrangements having two tiers of tracks for supporting the motor vehicles and manually positionable ramps are employed to drive the motor vehicles on and off the tiers. In some of the advanced designs, one or two of the vehicles are tilted to provide limited overlap and permit loading of one additional vehicle or more than one if the very small subcompact vehicles are loaded.

Referring to FIG. 1, there is shown a carrier 10 having a truck unit 12 and a detachably attachable trailer 14, the combined length of which meets the sixty-five (65) foot limit. The truck unit includes a super structure 16 composed of rigid members and repositionable pairs of tracks for transporting a total of five (5) motor vehicles 18 of the intermediate size. The trailer includes a superstructure 20 having fixed members supporting a plurality of selectively repositionable pairs of tracks, for supporting in stacked and overlapped relationship a total of seven (7) intermediate size motor vehicles 18. As will be described in much greater detail below, each of the pairs of tracks is tiltable, vertically positionable and longitudinally translatable with respect to adjacent pairs of tracks for loading, storing and unloading a supported vehicle.

Carrier 10 includes a hydraulic system for hydraulically repositioning each pair of tracks in response to actuation of a plurality of strategically placed levers, such as levers 22. Once in position, the sets of tracks are locked in place by mechanical means, such as pins engaging aligned apertures in elements otherwise moveable with respect to one another, such as stud encircling collars.

FIG. 2 provides an overview of carrier 10 less the vehicles illustrated in their stored or loaded position, as shown in FIG. 1. In particular, this figure illustrates the alignment of the various upper pairs of tracks to form a horizontal extended track to permit loading of the foremost upper pair of tracks. In addition, the upper rearmost and penultimate pairs of tracks 24 and 26, respectively, have been repositioned to conjointly form an essentially continuous ramp to provide access to the upper tier for loading and unloading purposes. Depending upon the length and mechanical configuration of pair of tracks 24, extension ramps 28 may or may not be required.

The details of truck unit 12 and its super structure 16 will be described with primary reference to FIGS. 3 and 4. Preferably, the truck unit includes a cab of the forward tilt type to eliminate the rear mounted engine and intrusion thereof into the storage capacity of super structure 16.

The structure and operation of the various pairs of tracks will be described sequentially from the front to the rear of the truck unit. A bar 30 supports one end of a pair of chain sections 32 and 34, which chain sections have the other end secured to cross member 36 of super structure 16. The bar is telescopically extendable from cross member 36 by extension of rods 38 and 40 penetrably mounted within tubular elements of the super structure. A pair of tracks 42 are in general alignment with chain sections 32 and 34 and are interconnected by cross member 36 and cross member 37. The other end of the pair of tracks are dependingly supported from arms 44 and 46. Links 48 and 50 are pivotally attached to the rear extremity of arms 44 and 46, respectively, and slidably engage uprights 52, 54 through collars 51, 53. Two hydraulic cylinders 56, one on each side are anchored to each opposed sides of framework 16 and each cylinder includes an extendable plunger 58 pivotally attached to one track of the pair of tracks 42.

In operation, actuation of cylinder 56 by means of one of levers 42, results in counterclockwise pivotal movement of pair of tracks 42 about a pivot point represented by crossmember 36. Commensurate therewith, collars 51 and 53 will slide upwardly along uprights 52 and 54, respectively. On achieving the desired tilt of pair of tracks 42, the collars may be pinned to their respective upright by pins, such as pin 60.

In the following description of the remaining pairs of tracks and associated structure, only one side will be referenced by numerals as the other side is duplicative and a mirror image thereof.

One end of pair of tracks 62 is vertically positionable by actuation of hydraulic cylinder 64 to relocate plunger 65 and position collar 68 vertically along uprights 66. The pair of tracks is also supported by a telescoping member 74. Extension and contraction of this telescoping member is effected by a hydraulic cylinder 70 driving a plunger 72 connected to telescoping member 74. Means, such as a pin 76, interlocks the elements of telescoping member 74 to lockably secure pair of tracks 62 for any selected length of the telescoping member.

In operation, actuation of hydraulic cylinder 70 produces clockwise or counterclockwise rotational movement of pair of tracks 62 about the pivot point attendant collar 68 while actuation of hydraulic cylinder 64 produces vertical repositioning of the pivot point. In combination, the two hydraulic cylinders thereby provide both vertical adjustment and pivotal orientation of pair of tracks 62.

One end of pair of tracks 80 is pivotally secured to longeron 82 of super structure 16 at pivot point 84. The other end of the pair of tracks is interconnected with longeron 82 through a pair of telescoping members 86, which members include means such as a pin 88 for lockingly interconnecting the elements of the member. The pair of tracks is pivotally raised or lowered by means of a hydraulic cylinder 90 driving a ram 92, actuation of which results in clockwise or counterclockwise movement of the pair of tracks about pivot point 84.

One end of pair of tracks 94 is pivotally secured to collars 96 located upon uprights 98. A hydraulic cylinder 100 is secured to longeron 82 and includes a plunger 102 attached to collar 96. Thereby, actuation of hydraulic cylinder 100 produces vertical displacement of one end of pair of tracks 94. The other end of the pair of tracks is pivotally secured to upright 104 by means of telescoping member 106. The extension of the telescoping member is regulated by hydraulic cylinder 108 and its attached plunger 110.

In operation, actuation of hydraulic cylinders 100 and 108 produces pivotal movement and/or vertical displacement of pair of tracks 94.

One end of pair of tracks 114 is slidably secured to upright 104 through collar 116, which collar is lower than the respective end of the pair of tracks to provide sufficient vertical displacement of the end of the pair of tracks. The vertical displacement of collars 116 is regulated by hydraulic cylinder 118 and interconnecting plunger 120. The other end of the pair of tracks is attached to super structure 16 through telescoping member 122 and a hydraulic cylinder 124 having an extendable plunger 126 for controlling the degree extension of the telescoping member.

By actuation of one or both of hydraulic cylinders 118 and 124, pair of tracks 114 may be pivotally and vertically repositionable.

A pair of tracks 130 are fastened to the bed of super structure 16 above the rear wheels and extends forwardly to a point proximate the rear extension of pair of tracks 80 when the latter are pivoted downwardly to a point proximate longeron 82 or the base of super structure 16.

In summary, truck unit 12 includes an upper tier of pairs of tracks 42, 62, 94 and 114, each of which are pivotable from a position in alignment with one another to permit passage thereacross during loading and unloading of motor vehicles. After serial loading of a vehicle upon each pair of tracks, pair of tracks 42 is pivotable counterclockwise to permit positioning of a vehicle upon tracks 62 in underlapping relationship thereof commensurate with vertical repositioning of the pair of tracks. Pair of tracks 94 is pivotable counterclockwise and vertically positionable to provide sufficient head space for a vehicle located therebeneath on the lower tier. Additionally, pair of tracks 114 is both pivotable and vertically positionable to permit a vehicle to underlap a vehicle located upon pair of tracks 94 and to accommodate the requisite head space for a vehicle located therebeneath on the lower tier. Pair of tracks 80 is pivotable counterclockwise after loading of a vehicle thereupon to accommodate overlapping of a vehicle subsequently located upon fixed pair of tracks 130.

Referring jointly to FIGS. 2, 5, 6, 7 and 9, the structure and operation of trailer unit 14 will be described. The trailer unit is secured to the truck unit by means of a conventional hitch apparatus 136, as is well known.

One end of a pair of tracks 138 is secured proximate the hitch apparatus through a fixed length pivotable arm 140. The arm is pivotally attached to superstructure 20 and is pivotally attached proximate one end of pair of tracks 138. A hydraulic cylinder 142 and associated plunger 144 interconnect the central area of arm 140 with longeron 146 of the superstructure. The other end of pair of tracks 138 is pivotally connected to plunger 148 which is extendable from hydraulic cylinder 150; the latter being pivotally connected to longeron 146.

In operation, actuation of hydraulic cylinder 142 produces a commensurate pivotal movement of arm 140. Pivotal movement of arm 140 translates the pivotally connected end of pair of tracks 138 through an arc. By appropriate dimensioning of the components and the pivot points, pair of tracks 138 are vertically and horizontally translatable to interconnect with the rear of tracks 130 located upon superstructure 16 of truck unit 12. Thereby, travel of vehicles from the trailer to the truck unit is achieved without any additional ramps therebetween. Actuation of hydraulic cylinder 150 raises and lowers the pivotally connected end of pair of tracks 138 to position a vehicle mounted thereon at its appropriate tilt angle; it also serves to locate the pivotally connected end of the pair of tracks to the next adjoining pair of tracks on the trailer when the pair of tracks is used as a pathway for loading and unloading vehicles.

A pair of tracks 152 is pivotally connected at one end to longeron 146 through a hydraulic cylinder 154 and plunger 156. The other end of the pair of tracks is pivotally connected to longeron 146 through an interconnecting pivotally attached arm 158.

On actuation of hydraulic cylinder 154 plunger 156 will contract resulting in pivotal movement of both the hydraulic cylinder and arm 158, which pivotal movement will raise and translate rearwardly pair of tracks 152 to a point of interconnection with the rear end of pair of tracks 138 to establish a pathway thereto. Additionally, the rear of pair of tracks 152 will support the forward end of pair of tracks 160 when the latter are placed thereon. Extention of plunger 156 results in opposite movement of the pair of tracks 152 until the latter rests upon the bottom of the superstructure 16.

Pair of tracks 160 are positionable parallel to and adjacent longeron 146 at the bottom of superstructure 20 by actuation of a hydraulic cylinder 162 and plunger 164. Rear end 166 of the pair of tracks is vertically positionable in response to extension of plunger 164 until it contacts a stop 168 protruding from frame member 170 of superstructure 20. Further extension of plunger 164 results in clockwise pivotal movement of pair of tracks 160 about rear end 166 to raise front end 170 above longeron 146 to a height sufficient to permit placement of the rear end of pair of tracks 152 thereneath. Necessarily, plunger 164 is pivotally connected to pair of tracks 160 at pivot point 172.

Pair of tracks 174 are supported by a dog-leg shaped lever 176 having one end pivotally secured proximate longeron 146 at pivot point 177. The other end of the lever is pivotally secured to the pair of tracks at pivot point 175. Pivotal movement of lever 176 is effected by hydraulic cylinder 178 pivotally attached to longeron 146 and plunger 180 pivotally attached to the lever. The rear end of set of tracks 174 includes shoes (not illustrated) slidable within a further pair of tracks 184, which tracks are attached to frame 170.

On extension of plunger 180, lever 176 will pivot rearwardly. Such pivotal movement will force the shoes of pair of tracks 176 to slide rearwardly within pair of tracks 184. On full extension of plunger 180, the geometry of lever 176 and of set of tracks 174 and the respective pivot points are such that essentially the complete set of tracks are supported within pair of tracks 184 in frame 170 when pivot point 175 is proximate the front of frame 170. Flippers or ramps 182 disposed at the front of pair of tracks 174 are retractable or foldable within pair of tracks 174 when the latter are located within pair of tracks 184.

Pair of tracks 184 may be pivotally attached at their rear point to frame 170 and include a positionable brace pivotally attached to the front of the pair of tracks. Upon downward pivotal movement (which may be manually) of the brace, the front of the pair of tracks will be maintained in a raised position. This raised position will provide additional overlapping clearance with the forwardly located vehicle. Before loading of pair of tracks 184 the brace is collapsed to permit the pair of tracks to rest on frame 170.

To load vehicles onto the lower tier of both truck 12 and trailer 14, the pair of tracks in the track unit are aligned with one another to permit a vehicle to be driven thereacross. Thereafter, pair of tracks 138 are pivoted forwardly to interconnect with tracks 130 of the truck unit. Pair of tracks 160 is raised until the rear end contacts stop 168 and thereafter further raised for force front end 170 to rotate upwardly. Pair of tracks 152 is raised and translated rearwardly to slide beneath front end 170 and interconnect with the rear end of pair of tracks 138. The resulting interconnecting sets of tracks presents a sufficiently nonundulating pathway to prevent bottoming out of any of the vehicles driven thereacross.

After the first vehicle has been loaded upon truck unit 12, pair of tracks 80 is pivoted counterclockwise to provide overlap for the second vehicle driven onto pair of tracks 130. Then, the pair of tracks 138 is lowered and a third vehicle is loaded thereon and tied thereto. The rear of pair of tracks is then raised. Pair of tracks 152 lowered and moved forwardly and the front of pair of tracks 160 is lowered. A fourth vehicle is loaded upon pairs of tracks 152 and 160 after which the rear of pair of tracks 160 is lowered. A fifth vehicle is driven onto pair of tracks 174 after the latter have been extended forwardly through contraction of plunger 180. The sixth vehicle is driven onto fixed pair of tracks 184 mounted upon frame 170 proximate the rear wheels of the trailer.

The pairs of tracks forming the upper tier of trailer unit 14 will now be described. A pair of tracks 188 is pivotally attached to upright 190 at pivot point 192, which pivot point extends from a collar 194. The collar is slidable a limited distance along upright 190 and it may be selectively secured thereto by pin 196. Raising and lowering of the front end of pair of tracks 188 as well as pivoting the pair of tracks about pivot point 192 may be effected by actuating hydraulic cylinder 198 having an interconnecting plunger 200. The rear end of the pair of tracks may be raised or lowered by a hydraulic cylinder 202 affixed to upright 204 and having plunger 206 extending therefrom into pivotal contact with the rear end of the pair of tracks. A pair of telescoping members 208 and 210 interconnect the rear end of pair of tracks 188 with upright 204 and include pin means 212 for lockingly positioning the rear end of the upright after actuation of hydraulic cylinder 202.

To obtain a pathway along the upper tier between the trailer unit and the truck unit, pair of tracks 188 include a further pair of tracks 214 extendable forwardly therefrom, as illustrated in FIG. 7. Pair of tracks 214 are slidably mounted within pair of tracks 188, the latter including overhang means 216 for preventing tilting of one set of tracks with respect to the other. Fore and aft sliding movement of pair of tracks 214 is effected by a hydraulic cylinder 218 extending from a cross-member 220 intermediate uprights 190. Extension and contraction of plunger 222, which plunger is attached to pair of tracks 214 via cross-arm 224 results in commensurate sliding movement of the pair of tracks.

A short pair of tracks 226 are vertically raisable at the rear of pair of tracks 188 by a hydraulic cylinder 228 actuating a plunger 230. The plunger is attached to pair of tracks 226 through a collar 232 vertically slidable upon upright 204. Pin means 234 may be employed to secure the collar at any selected vertical position along the upright.

The function and purpose of pair of tracks 226 is that of providing a pathway for the cars transported along the upper tier and to be positionable vertically out of the way to preclude interference with the front or rear overhang of vehicles mounted fore and aft thereof. Were the pathway represented by pair of tracks 226 simply an extension of either of the adjacent pair of tracks, interference with the front or rear overhang of the vehicles would occur, which interference would either cause damage during transport or preclude optimized loading of the vehicles.

The front end of a pair of tracks 236 is vertically positionable through a hydraulic cylinder 238 actuating a plunger 240. The plunger interconnects with a telescoping member 242 extendable from and contractable into upright 244. Pin means 246 are employed to secure the telescoping member with respect to the upright after repositioning of the telescoping member. Pivot means 248 are employed at the junction between telescoping member 242 and the pair of tracks. The rear of pair of tracks 236 may be raised or lowered by actuation of hydraulic cylinder 250 to extend or contract plunger 252. A pair of telescoping members 254 and 256 extend and contract commensurate with the translation of plunger 252. Pin means 58 may be employed to secure the telescoping members to one another after extension or contraction thereof. Extendable member 254 is pivotally secured to pair of tracks 236 through pivot means 260 to accommodate pivotal movement of the pair of tracks as either end is raised or lowered.

In operation, pair of tracks 236 serves as part of the pathway for loading and unloading the upper tier. Additionally, it serves as a location upon which a vehicle is secured during transport. During such transport, the pair of tracks is tilted to the configuration illustrated in FIG. 1 to provide overlapping and underlapping clearance with adjacent vehicles.

At the junctions of pair of tracks 188, 226 and 236 various changes may be made to increase or decrease the relative height differences to obtain greater or lesser clearance between the supported vehicles or the vehicles therebeneath. In example, the length of pair of tracks 226 may be charged and/or the pair of tracks may be made pivotable as well as vertically adjustable. Any change in length of pair of tracks 226 would have to be compensated by an equivalent modification of the length of pairs of tracks 188 and 236. Necessarily, additional bracing, whether fixed or movable may also be added.

The front end of a pair of tracks 262 is pivotally secured to pivot means 264 to a vertically raisable post 266 extending from upright 268. Vertical displacement of the front end of pair of tracks 262 is effected by hydraulic cylinder 270 actuating a plunger 272. The rear end of pair of tracks 262 is positionable vertically through actuation of hydraulic cylinder 274 and plunger 276 extending from the bottom rear end of superstructure 20. The plunger pivotally engages a member 278 attached to the pair of tracks and also supporting telescoping members 280 and 282. Pin means 284 may be employed to maintain positional rigidity between the telescoping members after the rear end of the pair of tracks has been positioned.

During loading and unloading of vehicles upon the upper tier, pair of tracks 262 is pivoted clockwise downwardly as illustrated in FIG. 2. To obtain a pathway between the rear end of the pair of tracks and ground, retractably extendable ramps 28 may be employed. These ramps are slidably securable to pair of tracks 262.

Pair of tracks 42 is loaded by driving a seventh vehicles across the aligned pairs of tracks of the upper tier; thereafter the pair of tracks is pivoted counterclockwise. An eighth vehicle is loaded upon pairs of tracks 62 and 94 in a straddling relationship. Before or after loading of the eighth vehicle, the front end of pair of tracks 62 is lowered to accommodate underlap with the seventh vehicle; pair of tracks 94 is pivoted counterclockwise to raise the rear of the eighth vehicle. After loading of the ninth vehicle on pair of tracks 144 the latter are lowered and pivoted clockwise after retraction of extendable pair of tracks 214. The front of pair of tracks 188 is raised to accommodate overhang of a tenth vehicle driven thereon with respect to the ninth vehicle. An eleventh vehicle is driven onto pair of tracks 236 and the latter are pivoted counterclockwise to raise the rear end of the pair of tracks. A twelfth vehicle is driven onto pair of tracks 262 and the latter are pivoted counterclockwise and the front end of the pair of tracks is lowered to accommodate underhang with the eleventh vehicle. Additionally, vertical repositioning of the front, rear or both ends of all or various ones of the pairs of tracks may be necessary to obtain sufficient clearance with adjacent vehicles. After loading of both tiers, ramps 28 are stored and the twelve loaded vehicles may be transported to their destination.

Unloading of the twelve vehicles is essentially a reverse of the above processes for the upper and lower tiers.

Figure 8:
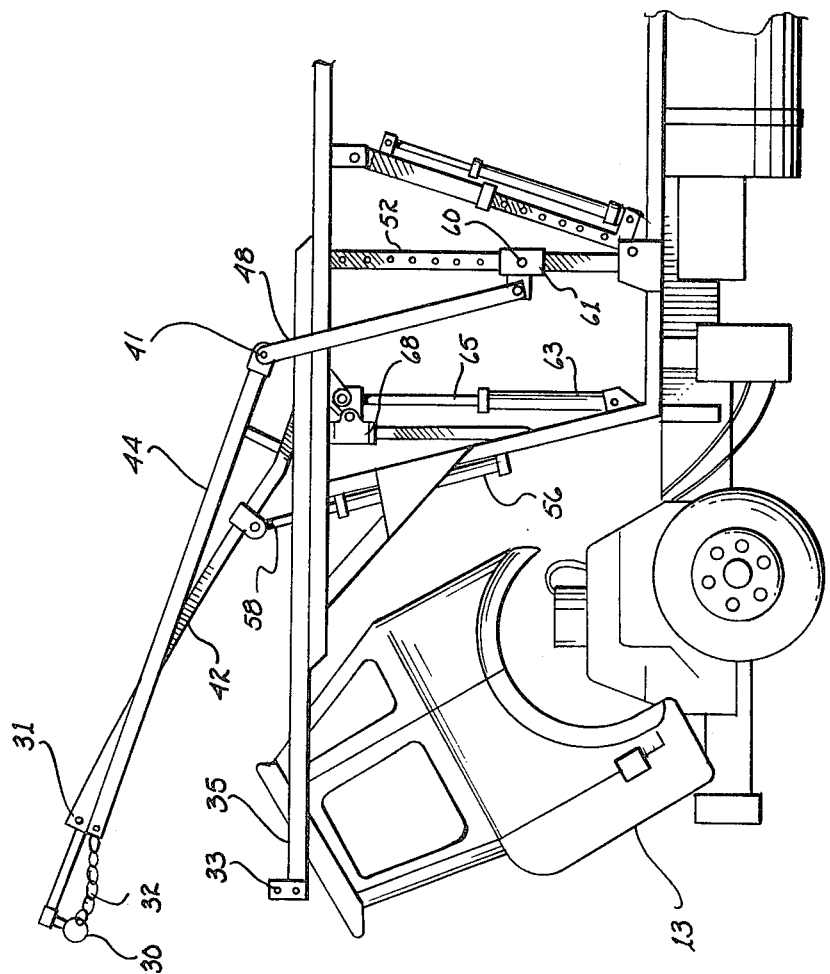
FIG. 8 is a fragmentary view illustrating pivotal displacement of a pair of tracks to provide access to the tilt cab.

Referring specifically to FIG. 8, the process for repositioning pair of tracks 42 and provide for forward tilt of cab 13 of the truck unit will be described. Initially, plunger 58 is retracted by operation of hydraulic cylinder 56 to pivot the pair of tracks clockwise about the pivot point 31 interconnecting the forward end of the pair of tracks with arms 44 and 46. Commensurate therewith, pin 60 is disengaged to permit downward translation of collar 61 upon upright 52. When the extent of rotational travel of pair of tracks 42 is achieved, collar 61 is repinned to upright 52 by engaging pin 60, such as the position illustrated in FIG. 8. Pin means 33 securing pivot point 31 to forward extension 35 of superstructure 16 is disengaged. Extension of plunger 58 by actuation of hydraulic cylinder 56 will result in clockwise rotation of pair of tracks 42 about pivot point 41, which pivot point interconnects line 48 with arm 44 and link 50 with arm 46. The resulting rotational movement of the pair of tracks 42 is continued until clearance is provided for forward tilt of cab 13, as illustrated in FIG. 8. Upon such tilt of the cab, access to and repair of the engine and other components disposed beneath and covered by the cab may be performed. It may be noted that such reorientation of tracks 42 may be performed with or without the presence of a vehicle located thereon, assuming only that sufficient clearance exists between such a vehicle and a further vehicle located upon pair of tracks 62.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A truck tractor unit and an attachable trailer unit for compactly transporting a plurality of motor vehicles in stacked and overlapping relationship with one another, said truck tractor unit and trailer unit comprising in combination:
   I. said truck tractor unit including superstructure comprising a first tier and a second tier, each of which tiers supports a plurality of motor vehicles;
   A. said first tier comprising:
      1. a first pair of tracks for supporting a motor vehicle and first means for pivoting said first pair of tracks;
      2. a second pair of tracks for supporting a motor vehicle and second means for pivoting said second pair of tracks and for altering the elevation of said second pair of tracks;
      3. a third pair of tracks for supporting a motor vehicle and third means for pivoting said third pair of tracks and for altering the elevation of said third pair of tracks;
   B. said second tier comprising:
      1. a fourth pair of tracks for supporting a motor vehicle and fourth means for pivoting said fourth pair of tracks;
      2. a fifth pair of tracks for supporting a motor vehicle;
   II. said trailer unit including superstructure comprising a first tier and a second tier, each of which tiers supports a plurality of motor vehicles;
   A. said first tier comprising:
      1. a sixth pair of tracks for supporting a motor vehicle, said sixth pair of tracks including:
         a. first means for interconnecting said sixth pair of tracks with said third pair of tracks during loading and unloading of the motor vehicles onto said first tier of said truck tractor unit; and
         b. sixth means for pivoting said sixth pair of tracks and for altering the elevation of said sixth pair of tracks;
      2. a seventh pair of tracks for supporting a vehicle, said seventh pair of tracks including seventh means for pivoting said seventh pair of tracks and for altering the elevation of said seventh pair of tracks;
      3. an eighth pair of tracks for supporting a motor vehicle, said eighth pair of tracks including eighth means for pivoting said eighth pair of tracks and for altering the elevation of said eighth pair of tracks;
      4. first ramp means extendable from said eighth pair of tracks to the ground during loading and unloading of the motor vehicles onto said first tiers of said truck tractor unit and said trailer unit;
   B. said second tier comprising:
      1. a ninth pair of tracks for supporting a motor vehicle, said ninth pair of tracks including:
         a. second means for interconnecting said ninth pair of tracks with said fifth pair of tracks during loading and unloading of the motor vehicles onto said second tier of said truck tractor unit;
      2. a tenth pair of tracks for supporting a motor vehicle and means for pivoting said tenth pair of tracks and for altering the elevation of said tenth pair of tracks;
      3. an eleventh pair of tracks for supporting a motor vehicle and means for pivoting said elevation pair of tracks to relocate said eleventh pair of tracks along said second tier;
      4. a twelfth pair of tracks for supporting a motor vehicle; and
      5. second ramp means extendable from said twelfth pair of tracks to the ground during loading and unloading of the motor vehicles onto said second tiers of said truck tractor unit and said trailer unit.

2. The truck tractor unit and trailer unit as set forth in claim 1 including further means for pivoting said first pair of tracks to permit tilting of the cab of said truck tractor unit.

3. The truck tractor unit and trailer unit as set forth in claim 1 wherein said first interconnecting means includes a pair of tracks slidably retained by said sixth pair of tracks for bridging a void intermediate said sixth pair of tracks and said third pair of tracks.

4. The truck tractor unit and trailer unit as set forth in claim 3 including power means for selectively extending and contracting said slidably retained pair of tracks.

5. The truck tractor unit and trailer unit as set forth in claim 1 wherein said second interconnecting means includes means for raising and lowering to pivot forwardly and rearwardly said ninth pair of tracks to bridge a void intermediate said ninth pair of tracks and said fifth pair of tracks.

6. The truck tractor unit and trailer unit as set forth in claim 5 including power means for selectively raising and lowering said ninth pair of tracks.

7. The truck tractor unit and trailer unit as set forth in claim 1 including means for relocating said tenth pair of tracks along said second tier commensurate with a change in elevation thereof to define a continuous path intermediate said ninth and said twelfth pairs of tracks.

8. The truck tractor unit and trailer unit as set forth in claim 7 wherein said tenth pair of tracks comprises a forward pair of tracks and a rearward pair of tracks and wherein said relocating means acts upon said forward pair of tracks.

9. The truck tractor unit and trailer unit as set forth in claim 1 including means for slidably engaging the rear end of said eleventh pair of tracks with said twelfth pair of tracks during relocation of said eleventh pair of tracks.

10. The truck tractor unit and trailer unit as set forth in claim 1 including means for selectively locking in position each of the repositionable ones of said pairs of tracks.

11. The truck tractor unit and trailer unit as set forth in claim 10 wherein said first interconnecting means includes a pair of tracks slidably retained by said sixth pair of tracks for bridging a void intermediate said sixth pair of tracks and said third pair of tracks.

12. The truck tractor unit and trailer unit as set forth in claim 11 wherein said second interconnecting means includes means for raising and lowering to pivot forwardly and rearwardly said ninth pair of tracks to bridge a void intermediate said ninth pair of tracks and said fifth pair of tracks.

13. The truck tractor unit and trailer unit as set forth in claim 12 including means for relocating said tenth pair of tracks along said second tier commensurate with a change in elevation thereof to define a continuous path intermediate said ninth and said twelfth pair of tracks.

14. The truck tractor unit and trailer unit as set forth in claim 13 wherein said tenth pair of tracks comprises a forward pair of tracks and a rearward pair of tracks and wherein said relocating means acts upon said forward pair of tracks.

15. The truck tractor unit and trailer unit as set forth in claim 14 including means for slidably engaging the rear end of said eleventh pair of tracks with said twelfth pair of tracks during relocation of said eleventh pair of tracks.

16. The truck tractor unit and trailer unit as set forth in claim 15 including hydraulic power means for selectively repositioning each of the repositionable ones of said pairs of tracks.

* * * * *